INVENTORS
JAMES B. GODSHALK
LEWIS A. MEDLAR

BY Arnold & Roylance

ATTORNEYS

INVENTORS
JAMES B. GODSHALK
LEWIS A. MEDLAR

ATTORNEYS

April 14, 1964 J. B. GODSHALK ETAL 3,129,373
BATTERY CHARGERS
Filed Oct. 18, 1960 3 Sheets-Sheet 3

INVENTORS
JAMES B. GODSHALK
LEWIS A. MEDLAR

BY Arnold *and* Roylance
ATTORNEYS

United States Patent Office 3,129,373
Patented Apr. 14, 1964

3,129,373
BATTERY CHARGERS
James B. Godshalk, West Pikeland Township, Chester County, and Lewis A. Medlar, Oreland, Pa., assignors to Fox Products Company, Philadelphia, Pa., a corporation of Pennsylvania
Filed Oct. 18, 1960, Ser. No. 63,343
5 Claims. (Cl. 320—25)

This invention relates to battery chargers and particularly to devices of the general type now employed to charge storage batteries in service stations, garages, industrial installations and the like.

It has long been recognized that, under the usual conditions of use, battery chargers are operated by persons having little technical skill. It is accordingly necessary to so construct the battery charger as to guard against improper operation thereof. A particular problem arises because, unless the operator is reasonably skilled, it frequently happens that the battery or batteries to be charged are connected with reverse polarity, that is, with the polarity of the battery being such that the battery aids, rather than opposes, the charging voltage. Connection of the battery to the charger in reverse can, and in actual practice frequently does, cause severe damage. Thus, the large amount of D.C. power in the battery can burn out the rectifier and transformer and melt the leads of the charger, so that the charger is totally ruined, and may damage the battery terminals beyond repair. Further, assuming that the battery has been in use recently, arcing, which occurs at the battery terminals during connection of the battery to the charger in reverse, can cause explosions by igniting gases in the cells of the battery. If the cell caps are in place when the explosion occurs, the force of the explosion may shatter the battery, damaging it beyond repair and possibly injuring the operator of the charger.

Prior art workers have devised many types of systems for guarding against connecting the battery in reverse polarity. In particular, it has heretofore been proposed to employ relay systems constructed and arranged to automatically correct the polarity of the battery when the same has been connected improperly. Unfortunately, such automatic polarity correcting systems have been quite expensive and, while highly successful, frequently cannot be incorporated in a particular line of battery chargers because of economical considerations.

The fact that battery chargers are usually operated by unskilled persons also lends difficulty to the problem of designing a battery charger for charging batteries of either of two different voltage ratings. For service stations and garage purposes, for example, it is presently desirable that the charger be capable of handling both 6-volt and 12-volt batteries. Heretofore, battery chargers have had such capabilities but have usually required that the operator make some adjustments or control manipulations in accordance with the voltage rating of the battery being charged. While the operator is usually aware of the difference between the batteries in question, it does not necessarily follow that, once the battery is connected, the charger will be properly set up for charging that particular battery.

It is accordingly a general object of the invention to provide a relatively inexpensive, dependable, automatic battery charger of the general type described.

Another object is to provide, in such a battery charger, simple and economical means for not only indicating when the battery has been connected with reverse polarity but also positively and automatically preventing operation of and damage to the charger so long as the battery remains incorrectly connected.

A further object is to provide a battery charger of the type described, including a voltage-responsive control circuit, with automatic means for properly and safely conditioning both the charging circuit and the control circuit not only in accordance with the polarity of connection of the battery but also in accordance with the particular type of battery involved.

In order that the manner in which these and other objects are attained, in accordance with the invention, can be understood in detail, reference is had to the accompanying drawings, which form a part of this specification, and wherein.

Figure 1:
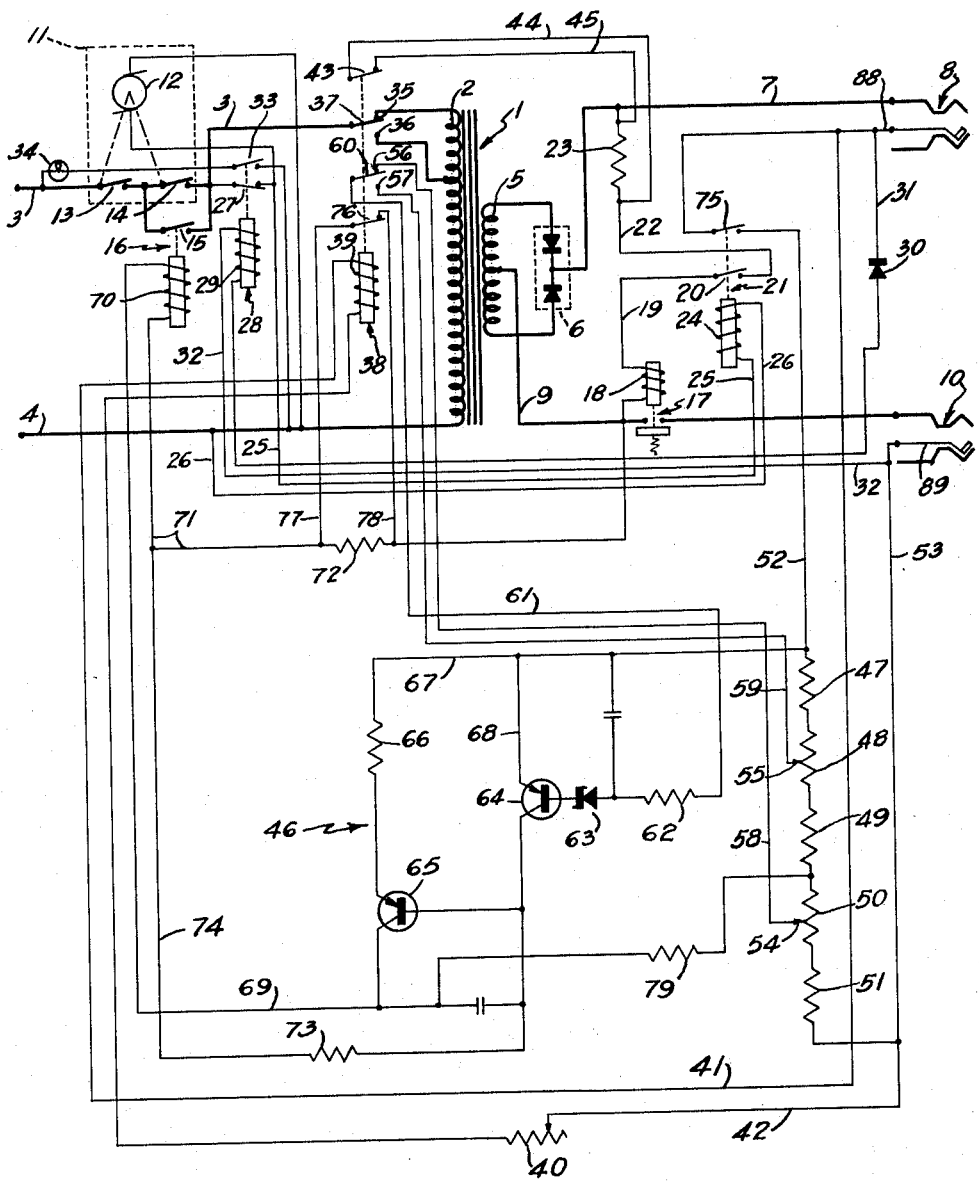
FIG. 1 is a schematic diagram of a battery charger constructed in accordance with one embodiment of the invention.

Referring now to the drawings in detail, and first to FIG. 1, it will be seen that the embodiment of the invention here illustrated includes a charging circuit comprising a transformer 1 having a primary winding 2 connectable to a source of alternating current (not shown) via conductors 3 and 4. Transformer 1 has a center tapped secondary winding 5 across which is connected a center tapped rectifier 6. One charging lead 7 connects the center tap of rectifier 6 to the positive terminal clamp 8. A second charging lead 9 is connected between the center tap of secondary winding 5 and the negative terminal clamp 10.

The particular battery charger illustrated is designed for automatic operation in accordance with my copending application Serial No. 51,856, filed concurrently herewith, now Patent No. 2,979,650. Thus, the charger employs a time switch indicated generally at 11 and including a synchronous electrical driving motor 12 and two sets of contacts 13 and 14, contacts 13 and 14 being interposed in series in conductor 3. The normally open contacts 15 of a control relay 16 are connected in parallel with contacts 14, as shown. The time switch driving motor 12 is connected between conductors 3 and 4, as shown, in such fashion that the motor is energized only when both contacts 13 and 14 or both contacts 13 and 15 are closed. As fully described in the aforementioned copending application, charging is terminated whenever contacts 13 are opened and also whenever both contacts 14 and 16 are opened, even though contacts 13 be closed. Time switch 11 includes cam means (not shown) driven by motor 12 and constructed and arranged to accomplish opening of contacts 14 at the end of a first, shorter time period and opening of contacts 13 at the end of a second, longer time period. As will be described in detail hereinafter, contacts 15 of relay 16 are automatically opened when the terminal voltage of the battery or batteries being charged reaches a predetermined value.

The charger includes a solenoid contactor, indicated generally at 17, having normally open contacts interposed in charging lead 9. The actuating solenoid 18 of contactor 17 is connected between charging leads 7 and 9, so as to be energized by direct current from rectifier 6, via a circuit comprising conductor 19, the normally open contacts 20 of a relay 21, conductor 22 and resistance 23. Thus, contactor 17 normally interrupts the charging circuit but is actuatable to charging circuit completing condition when relay 21 operates to close its contacts 20.

Relay 21 includes an actuating winding 24 connected between alternating current conductors 3 and 4 by conductors 25 and 26. The normally closed contacts 27 of a relay 28 are interposed in conductor 26, so that winding 24 of relay 21 can be energized only so long as contacts 27 are closed.

Relay 28 is provided with an actuating winding 29 connected in series with a rectifier diode 30, the series combination of winding 29 and diode 30 being connected between clamps 8 and 10 by conductors 31 and 32. As shown, diode 30 is so poled as to pass current only when the battery (not shown) to be charged is connected in reverse polarity, that is, with its negative terminal connected to clamp 8 and its positive terminal connected to clamp 10.

Accordingly, if the clamps 8 and 10 are properly connected to the battery for charging, the diode 30 will prevent current from the battery from being supplied to winding 29 of relay 28. Contacts 27 will therefore remain closed and, assuming that the time switch has been properly set, alternating current will flow via conductors 25 and 26 to energize winding 24 of relay 21, so closing contacts 20 and causing the solenoid 18 of contactor 17 to be energized. Charging lead 9 is accordingly completed and charging can proceed. On the other hand, if the clamps 8 and 10 are connected to the battery in the reverse manner, with clamp 8 attached to the negative terminal and clamp 10 to the positive terminal, current will then flow from the battery through winding 29 of relay 28 via the diode 30. Accordingly, contacts 27 will be open, relay 21 cannot be energized and contactor 17 therefore cannot be closed.

Relay 28 includes normally open contacts 33 connected in series with an indicator lamp 34, the combination of contacts 33 and lamp 34 being connected between conductors 3 and 4, as shown, so that the lamp is energized whenever contacts 33 close, regardless of the condition of contacts 13, 14 and 15. Hence, lamp 34 gives a positive indication that the battery has been connected with reverse polarity and that charging will not proceed.

In order that the charger can automatically charge batteries of at least two different voltages, the primary winding 2 of transformer 1 is provided with two taps, one being an end terminal of the winding and the other being spaced therefrom by a predetermined number of turns, the two taps being connected respectively to fixed contacts 35 and 36 which cooperate with movable contact 37, contacts 35–37 constituting one contact set of a multiple contact relay 38 having an energizing winding 39. Movable contact 37 is resiliently biased, in conventional fashion, into normal engagement with fixed contact 35. The parameters of the charging circuit are so chosen that proper charging will be carried out for batteries of one given voltage rating (here assumed to be 6 volts) when contact 37 engages contact 35, and for batteries of a second, higher given voltage (here assumed to be 12 volts) when contact 37 engages contact 36. Winding 39 of relay 38 is connected in series with a calibrating potentiometer 40 and the series combination of the winding and potentiometer are connected between connector clamps 8 and 10, as shown, by conductors 41 and 42. The characteristics of relay 38 and potentiometer 40 are so chosen that winding 39 is energized when clamps 8 and 10 are connected to a 12-volt battery but is not energized when the clamps are connected to a 6-volt battery. Thus, when a 6-volt battery is to be charged, contact 37 remains in its normal engagement with contact 35 and charging proceeds, assuming that the charging circuit has been otherwise properly conditioned to supply charging current. When a 12-volt battery is connected to the clamps, winding 39 is energized and movable contact 37 is actuated into engagement with fixed contact 36 so that the proper charging rate for the 12-volt battery is automatically provided.

Since the solenoid 18 of contactor 17 is connected across the output of rectifier 6, the contactor must be made to properly respond, and close its contacts to complete lead 9, regardless of whether the charging circuit is working at the level desired for a 6-volt battery or at the level desired for a 12-volt battery. Accordingly, a resistance 23 is connected in conductor 22 in series with solenoid 18 and relay 38 is provided with normally closed contacts 43, the normal operation of contacts 43 being to shunt resistance 23 via conductors 44 and 45. When relay 38 is energized to condition the apparatus for charging a 12-volt battery, contacts 43 are opened and resistance 23 is therefore connected effectively in series with solenoid 18, assuring the proper operating voltage for the solenoid.

Operation of relay 16 is accomplished automatically in response to the terminal voltage of the battery by a control circuit indicated generally at 46. Circuit 46 includes a voltage divider comprising series connected resistances 47–51, the voltage divider being connected between clamps 8 and 10 via conductors 52 and 53. The voltage divider is employed to derive from the battery being charged a voltage representative of the terminal voltage of the battery. The voltage divider is provided with two alternatively employed output terminals indicated at 54 and 55, these output terminals being connected respectively to fixed contacts 56 and 57 of a third set of contacts of relay 38, such connection being via conductors 58 and 59, respectively. Fixed contacts 56 and 57 cooperate with a movable contact 60 resiliently biased in conventional fashion to normally engage contact 56 and therefore normally select output terminal 54 of the voltage divider. Energization of relay 38, when a 12-volt battery is properly connected to the charger, actuates contact 60 into engagement with contact 57, so selecting output terminal 55 of the voltage divider. Via conductor 61, movable contact 60 is connected to one terminal of resistance 62, the other terminal of this resistance being connected via a Zener diode 63 to the base of a PNP type transistor 64.

Circuit 46 includes a second PNP type transistor 65. The emitter of transistor 65 is connected via resistance 66 and conductor 67 to conductor 52 and thus to that end of the voltage divider connected to clamp 8. The emitter of transistor 64 is connected by conductor 68 directly to conductor 67. The collector of transistor 65 is connected by conductor 69 to one terminal of actuating winding 70 of relay 16, the other terminal of the winding being connected via conductor 71 and resistance 72 to lead 9 at a point between the center tap of winding 5 and the contacts of contactor 17.

The collector of transistor 64 is connected via resistance 73 and conductor 74 to conductor 71 and therefore to lead 9 at a point between the center tap of winding 5 and the contacts of contactor 17.

Relay 21 includes a second set of normally open contacts 75 interposed in conductor 52. Accordingly, the voltage divider is operative to control relay 16 only when winding 24 of relay 21 is energized to close contacts 75 and, therefore, only when the battery to be charged has been connected with proper polarity to clamps 8 and 10.

Relay 38 includes a further set of normally closed contacts 76. When closed, as a result of energization of winding 39, contacts 76 shunt resistance 72 via conductors 77 and 78. Thus, when the battery to which clamps 8 and 10 are connected is a 6-volt battery, resistance 72 is not included in series with winding 70 of relay 16. When the battery is a 12-volt battery, however, relay 38 is energized to open contacts 76 and resistance 72 is therefore no longer shunted, being now in series with winding 70. Relay 16 is chosen to operate properly under the conditions for a 6-volt battery when resistance 72 is shunted and to operate properly under the conditions for a 12-volt battery when resistance 72 is not shunted.

Assuming that clamps 8 and 10 have been properly connected to a 6-volt battery to be charged and that the charger has otherwise been properly conditioned for operation, contacts 75 will be closed, relay 38 will be de-energized so that contact 60 engages contact 56, selecting output terminals of the voltage divider and contacts 76 will be closed, shunting resistance 72. If the battery to which clamps 8 and 10 are connected is a 12-volt battery, contacts 75 will still be closed but relay 38 will be energized, causing movable contact 60 to be actuated into engagement with contact 57, so that output temrinal 55 is selected. Contacts 76 are open and resistance 72 is therefore not shunted.

The combination of the voltage divider comprising resistances 47–51 and relay 38 is effective to derive from the battery to which clamps 8 and 10 are connected a voltage which is related to the terminal voltage of the battery. The voltage so derived is supplied to Zener diode 63, the Zener diode being so poled as to receive current from the battery only in the inverse (high resistance) direction. Regardless of whether the battery is a 6-volt battery or a 12-volt battery, the voltage applied to the Zener diode is caused to be in a given operating range determined by the characteristics of the diode, this being accomplished by automatic selection of the proper one of output terminals 54 and 55, it being understood that these output terminals are spaced electrically along the voltage divider. A definite terminal voltage for 6-volt batteries and a definite terminal voltage for 12-volt batteries are chosen for which circuit 46 is to cause contacts 15 to open. Assuming that the battery has been properly connected and has a terminal voltage below the definite predetermined value, the voltage applied to the Zener diode will be inadequate to cause the diode to conduct.

Still assuming that the voltage derived from the battery by the voltage divider via the selected one of output terminals 54, 55 is below the predetermined value, transistor 64 is fully non-conductive and transistor 65 is fully conductive. Since transistor 65 conducts, current flows through relay winding 70 so that relay 16 is energized and contacts 15 are closed. As charging proceeds, and the terminal voltage of the battery increases, the voltage derived from the voltage divider and applied to the Zener diode increases until it reaches the predetermined critical value for the diode. The Zener diode then becomes conductive. At the instant the diode becomes conductive, the current therethrough is just sufficient to make transistor 64 conductive. The value of resistance 73 is so selected that the potential at the base of transistor 65 is at the edge of saturation for that transistor. Hence, a slight flow of current through transistor 64 causes the emitter-to-base potential of transistor 65 to decrease, resulting in a decrease in conductivity of transistor 65.

A positive feedback circuit is provided, comprising resistance 79 connected between the collector of transistor 65 and a point on the voltage divider spaced electrically from the output terminals thereof. Accordingly, as transistor 65 becomes less conductive, less current flows through resistance 79 and a greater voltage is accordingly applied from the voltage divider to Zener diode 63. The emitter-to-collector current of transistor 64 therefore increases still further, resulting in a further decrease in the potential at the base of transistor 65. Transistor 65 is thus positively caused to become completely nonconductive and all current flow in relay winding 70 therefore ceases. Contacts 15 accordingly are allowed to return to their resiliently biased, open position.

If this action occurs after time switch 11 has operated to open contacts 14, opening of contacts 15 will terminate charging. On the other hand, if contacts 15 open prior to opening of contacts 14, it is opening of the latter contacts which will terminate charging. Thus, the combination of time switch 11 and circuit 46 assures that the battery will be charged for at least that time period required for the time switch to open contacts 14. Charging may continue for a longer period, terminating either by opening of contacts 15, in response to occurrence of the predetermined battery terminal voltage, or by opening of contacts 13 at the end of the maximum period provided by time switch 11.

It is to be noted that control circuit 46 is so constructed and arranged that it will condition itself automatically to maintain relay winding 70 energized so long as the voltage divider supplies to Zener diode 63 a voltage below the critical value for that diode and so long as current is supplied through transistor 65. In this connection, the circuit comprising rectifier diode 30 and relays 15 and 21 is effective to prevent such conditioning of control circuit 46 in the event that the clamps 8 and 10 are connected to a battery in reverse polarity with respect to that required for proper charging of the battery.

Figure 2:
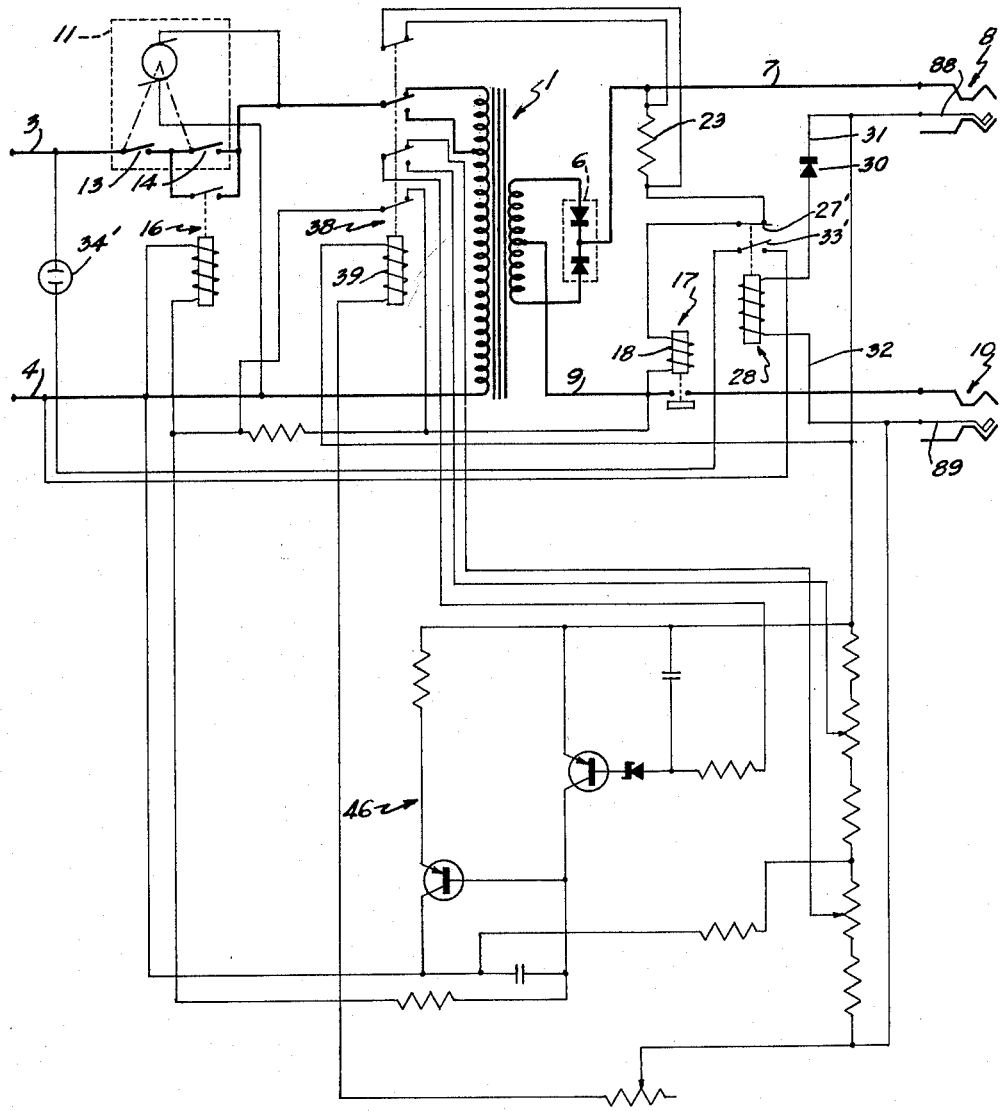
FIG. 2 is a schematic diagram illustrating a battery charger constructed in accordance with another embodiment of the invention.

FIG. 2 illustrates another embodiment of the invention wherein the polarity responsive relay acts directly in the D.C. circuit of the charger, the A.C. relay 21, FIG. 1, being eliminated. In the embodiment of FIG. 2, transformer 1, conductors 3, 4, rectifier 6, leads 7, 8, timer 11, contactor 17, control circuit 46 and relay 16 remain essentially as hereinbefore described with reference to FIG. 1. The normally closed contacts 27' of relay 28 are, however, now connected directly in series with the actuating winding 18 of contactor 17. Normally open contacts 33' of relay 28 are connected in series with indicating lamp 34', the lamp being connected between conductors 3 and 4 when contacts 33' are closed. Operation of the embodiment of FIG. 2 is essentially the same as that of FIG. 1, except that the D.C.-operated relay 28 acts directly to control the energizing circuit of the solenoid contactor 17. In this embodiment, however, the automatic action of relay 28 is effective not only to protect the charging circuit from damage but also to assure that accidental connection of the battery in reverse will not cause a damaging current flow through the transistors of circuit 46.

Figure 3:
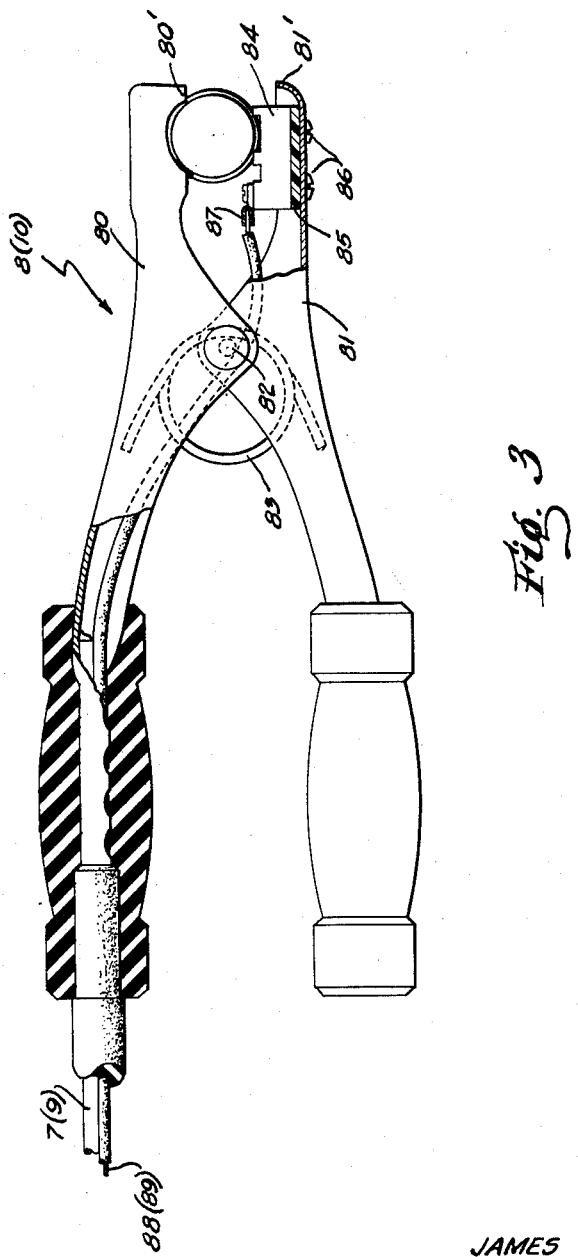
FIG. 3 is a side elevational view, with parts broken away for clarity, of a terminal clamp employed in the battery chargers of FIGS. 1 and 2.

In both the charger of FIG. 1 and the charger of FIG. 2, terminal clamps 8 and 10 are each constructed in the manner illustrated in FIG. 3. Each terminal clamp thus comprises individual clamp members 80 and 81 pivoted together about pivot pin 82 and biased, by torsion spring 83, to close jaw portions 80' and 81'. The charging leads 7 and 9 are each connected electrically to the clamp member 80 of the corresponding clamp. Therefore, an electrically conductive path is provided from the charging lead to the other clamp member 81 of the clamp.

Each jaw portion 81' carries a terminal contacting block 84 which is separated from member 81 and electrically insulated with respect to that member by a sheet 85 of electrical insulating material. Block 84 is secured to jaw portion 81' by screws 86 which also are of electrical insulating material.

Each block 84 is provided with a connector 87 which can be of any suitable conventional type and is illustrated here as the soldering lug. An electrical conductor insulated from the corresponding charging lead and from all parts of the clamp save block 84, is soldered to connector 87. Considering the circuit of FIG. 1, the conductor just referred to is indicated at 88, for clamp 8, and 89, for clamp 10. It will thus be seen that winding 39 of relay 38 is connected between conductors 88 and 89 and therefore between the blocks 84 of clamps 8 and 10. Similarly, input conductors 52 and 53 for circuit 46 are connected between the blocks 84 of clamps 8 and 10, as is the polarity responsive circuit comprising diode 30 and conductors 31, 32. Hence, assuming that at least one of the clamps 8 and 10 is not effectively connected to a terminal of the battery being charged, blocks 84 of clamps 8 and 10, and therefore conductors 88 and 89 and the circuit portions connected thereto, are electrically isolated from the output of rectifier 6. The arrangement just described is duplicated in the charger of FIG. 2 and, as to this feature, no further explanation of the circuit of FIG. 2 is required.

Electrical isolation of the circuit portions connected to blocks 84 from the charger output in the manner just described is essential to assure proper operation of the charger under all circumstances. From the foregoing descriptions of the operation of FIGS. 1 and 2, it will be obvious that both circuits would operate satisfactorily without the isolation of the various control circuits from the charger output (that is, even if conductors 88, 89 were each connected directly to one of the clamp members 80, 81) so long as the clamp members remained in good electrical contact with the terminals of the battery. However, there is no assurance that such good contact of the clamps with the battery terminals will be maintained throughout each cycle of operation of the charger. In fact, it frequently occurs that the operator of the charger will rock or otherwise adjust the clamps on the battery terminals during charging and this manipulation of the clamps frequently results in a momentary disconnection of the battery from the charger while the charging circuit is energized.

Now, assume that either the charger of FIG. 1 or the charger of FIG. 2 is connected to a 6-volt battery to charge the same so that, because a 6-volt rather than a 12-volt battery is involved, relay 38 remains de-energized, with contact 37 engaging contact 35 to provide the proper charging level for a 6-volt battery. Assume that one of the clamps 8, 10 is momentarily disengaged from the corresponding terminal of the battery, so that the battery is electrically removed from the circuit, the battery load therefore is removed, with the result that the rectified D.C. output, appearing across leads 7 and 9, increases. Assuming that the charging circuit has been properly designed to handle both 6- and 12-volt batteries, the increase in output voltage just referred to will, in all probability, be sufficiently great to provide a voltage adequate to energize winding 39 of relay 38, assuming that the output voltage is impressed across this winding. Accordingly, the increase in output voltage of the charger, resulting from momentary disconnection of the battery, would cause relay 38 to condition the charger for 12-volt operation. Then, when the 6-volt battery again appears across the output of the charger, the resulting decerase in output voltage of the charger may not be adequate to assure that the votlage now appearing across winding 39 is below the "drop out voltage" of the relay. Accordingly, the act of rocking or otherwise momentarily disconnecting one of the clamps 8, 10, results in operation of the charger at the 12-volt level, even though the 6-volt battery remains connected for charging.

This contingency is completely avoided, in accordance with the present invention, by the electrical isolation accomplished by connecting conductors 88 and 89 to the insulated blocks 84. With this arrangement, winding 39 of relay 38, the polarity responsive circuit comprising diode 30 and conductors 31, 32, and the voltage divider providing the input for control circuit 46 can receive current only when both clamps 8 and 10 are properly connected to the terminals of the battery. Rocking of one or both of the clamps in such fashion as to cause a momentary disconnection thereof from the battery will inherently result in de-energization of all of the control circuit portions connected between blocks 84 and conductors 88 and 89.

While FIGS. 1 and 2 illustrate particularly advantageous embodiments of the invention, it will be obvious to those skilled in the art that various changes and modifications can be made in the circuits there shown without departing from the scope of the invention as defined in the appended claims.

What is claimed is:

1. In a battery charger, the combination of a charging circuit including a pair of leads connectable to at least one storage battery for supplying charging current thereto; a contactor connected to normally interrupt said charging circuit and actuatable to charging circuit completing conditions; a first electromagnetic relay comprising an actuating winding and normally open contacts connected to control said charging circuit and arranged to be closed when said actuating winding is energized; a control circuit connectable to the battery to be charged and responsive to the terminal voltage thereof, said control circuit being connected to the actuating winding of said first relay and operative to maintain said actuating winding energized so long as the terminal voltage of the battery is below a predetermined value; a second electromagnetic relay; an asymmetrically conductive device; circuit means connecting the actuating winding of said second relay and said asymmetrically conductive device in series across said leads with said asymmetrically conductive device poled to pass current from the battery when the latter is connected to said leads with a predetermined polarity, said second relay having contacts connected to prevent said contactor from being actuated to charging circuit completing condition and said control circuit from being activated to energize the winding of said first relay so long as the battery is connected to said leads with the opposite polarity required for charging, and electrical indicating means connected to indicate when said relay has operated to prevent closing of said contactor.

2. A battery charger in accordance with claim 1 and wherein said control circuit comprises a circuit portion connectable across the battery to derive current therefrom and said second relay is connected to interrupt said circuit portion.

3. In a battery charger, the combination of charging circuit means including a transformer having a primary and a secondary winding, a rectifier connected to said secondary winding, a pair of D.C. charging leads connected to receive current from said rectifier, and a pair of A.C. leads connectable to said primary winding; two pivoted jaw terminal clamps each including a pair of jaw portions which are electrically insulated from each other and arranged to cooperate to clamp a terminal of the battery to be charged, each of said D.C. leads being electrically connected to one of said jaw portions of a different one of said clamps; a relay having contacts connected to establish a primary circuit comprising said primary winding and said A.C. leads with said primary circuit selectively including different portions of said primary winding to provide different outputs for charging batteries of different known voltage ratings, said relay also including an actuating winding; and control circuit means connected between the others of said jaw portions to receive current from the battery when said clamps are connected to the terminals of the battery to be charged, said control circuit means being connected to the actuating winding of said relay to energize the same selectively in accordance with the voltage of the battery to which said clamps are connected.

4. A battery charger in accordance with claim 3 and further comprising a contactor connected to normally interrupt said charging circuit and actuatable to charging circuit completing condition; a second relay; an asymmetrically conductive device, and further control circuit means connecting the actuating winding of said second relay and said asymmetrically conductive device in series across the battery to be charged when said clamps are connected to the terminals of the battery with said asymmetrically conductive device poled to pass current from the battery when the latter is connected with a predetermined polarity, said second relay having its contacts connected to prevent said contactor from being actuated to charging circiut completing condition when the battery is connected with the opposite polarity required for charging.

5. A battery charger in accordance with claim 3 and further comprising a second relay including an actuating winding and normally open contacts connected to control said charging circuit and arranged to be closed when said actuating winding is energized, a relay actuating circuit operatively connected to said actuating winding of said second relay to energize the same, and further control circuit means including a circuit portion constructed and arranged to derive from the battery, when said clamps are connected thereto, an electrical quantity related to the terminal voltage of the battery, and said actuating circuit being connected to respond to said electrical quantity to energize said actuating winding of said second relay so long as the terminal voltage of the battery is below a predetermined value.

References Cited in the file of this patent

UNITED STATES PATENTS

| | | |
|---|---|---|
| 2,395,038 | Corning | Feb. 19, 1946 |
| 2,711,504 | King | June 21, 1955 |
| 2,766,418 | Rice | Oct. 9, 1956 |

FOREIGN PATENTS

| | | |
|---|---|---|
| 483,408 | Canada | May 20, 1952 |